(12) United States Patent
Yamamoto et al.

(10) Patent No.: US 7,596,616 B2
(45) Date of Patent: *Sep. 29, 2009

(54) EVENT NOTIFICATION METHOD IN STORAGE NETWORKS

(75) Inventors: Masayuki Yamamoto, Kanagawa (JP); Yuichi Taguchi, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/829,763

(22) Filed: Jul. 27, 2007

(65) Prior Publication Data

US 2007/0271377 A1    Nov. 22, 2007

Related U.S. Application Data

(63) Continuation of application No. 10/237,402, filed on Sep. 6, 2002, now Pat. No. 7,260,628.

(51) Int. Cl.
*G06F 15/173* (2006.01)

(52) U.S. Cl. .................. 709/224; 709/223; 709/225

(58) Field of Classification Search .................. None
See application file for complete search history.

(56) References Cited

U.S. PATENT DOCUMENTS

| 5,574,856 | A |  | 11/1996 | Morgan et al. |
| 5,909,691 | A |  | 6/1999 | Schultz et al. |
| 6,105,146 | A |  | 8/2000 | Tavallaei et al. |
| 6,134,673 | A |  | 10/2000 | Chrabaszcz |
| 6,182,182 | B1 |  | 1/2001 | Bradley et al. |
| 6,247,099 | B1 |  | 6/2001 | Skazinski et al. |
| 6,314,460 | B1 |  | 11/2001 | Knight et al. |
| 6,314,503 | B1 |  | 11/2001 | D'Errico et al. |
| 6,324,162 | B1 |  | 11/2001 | Chaudhuri |
| 6,636,981 | B1 | * | 10/2003 | Barnett et al. ............... 714/4 |
| 6,697,924 | B2 | * | 2/2004 | Swank ................. 711/163 |
| 6,880,101 | B2 | * | 4/2005 | Golasky et al. ............. 714/4 |
| 7,167,473 | B1 | * | 1/2007 | Nguyen .................. 370/392 |
| 7,260,628 | B2 | * | 8/2007 | Yamamoto et al. .......... 709/224 |
| 2001/0054093 | A1 | * | 12/2001 | Iwatani ................... 709/223 |
| 2002/0047862 | A1 |  | 4/2002 | Aoki et al. |
| 2002/0099914 | A1 |  | 7/2002 | Matsunami et al. |
| 2003/0131108 | A1 |  | 7/2003 | Kagami et al. |

FOREIGN PATENT DOCUMENTS

| JP | 2000-163325 | 6/2000 |
| JP | 2002-215472 | 8/2002 |
| JP | 2002-222061 | 8/2002 |
| JP | 2002-229740 | 8/2002 |
| JP | 2002-77182 | 3/2005 |

* cited by examiner

*Primary Examiner*—John Follansbee
*Assistant Examiner*—Dhairya A Patel
(74) *Attorney, Agent, or Firm*—Mattingly & Malur, P.C.

(57) ABSTRACT

A heterogeneous network includes network related hardware and software products from a plurality of vendors. The network includes a storage system configured to store data, a server configured to process requests, a switch coupling the storage system and the server for data communication, and a network manager including an event dictionary to interpret an event message received from a device experiencing failure.

14 Claims, 15 Drawing Sheets

| Disk Port ID | WWN |
|---|---|
| d1 | WWNd1 |
| d2 | WWNd2 |

| Logical Device ID | Disk Drive List |
|---|---|
| v1 | dd1, dd2, dd3, dd4 |
| v2 | dd1, dd2, dd3, dd4 |

| Path ID | Disk Port ID | Cache ID | Logical Device ID | SCSI ID | SCSI LUN |
|---|---|---|---|---|---|
| p1 | d1 | c1 | v1 | 2 | 1 |
| p2 | d1 | c1 | v2 | 3 | 1 |
| p3 | d2 | c2 | v2 | 2 | 2 |

| Switch Port ID | Switch Port WWN | Link WWN |
|---|---|---|
| s1 | WWNs1 | WWNa1 |
| s2 | WWNs2 | WWNb1 |
| s3 | WWNs3 | WWNd1 |
| s4 | WWNs4 | WWNd2 |

FIG. 3B

| Host Port ID | WWN | SCSI ID | 406a |
|---|---|---|---|
| a1 | WWNa1 | 2 | |

410a, 412a, 414a

| Binding ID | Host Port ID | SCSI ID | LUN | Inquiry Information | 408a |
|---|---|---|---|---|---|
| LU1 | a1 | 2 | 1 | VendorD, StorageD, Logical Device v1 | |
| LU2 | a1 | 2 | 2 | VendorD, StorageD, Logical Device v2 | |

416a, 418a, 420a, 422a, 424a

| Host Port ID | WWN | SCSI ID |
|---|---|---|
| b1 | WWNb1 | 3 |

| Binding ID | Host Port ID | SCSI ID | LUN | Inquiry Information |
|---|---|---|---|---|
| LU1 | b1 | 3 | 1 | VendorD, StorageD, Logical Device v2 |

| Discovery ID | Device Type | Device Information | IP Address |
|---|---|---|---|
| 1 | Server | Vendor A, ServerA | 100.100.100.100 |
| 2 | Server | Vendor B, ServerB | 100.100.100.101 |
| 3 | SAN Switch | Vendor C, SwitchC | 100.100.100.102 |
| 4 | Storage Subsystem | Vendor D, StorageD | 100.100.100.103 |

556　558　560　562

| Server | | | Interconnect | | | | Storage | | | |
|---|---|---|---|---|---|---|---|---|---|---|
| Name | Binding ID | Host Port ID | Name | Port ID | Name | Port ID | Storage Name | Disk Port ID | Cache ID | Logical Device ID |
| ServerA | LU1 | a1 | Switch C | s1 | Switch C | s3 | Storage D | d1 | c1 | v1 |
| ServerA | LU2 | a1 | Switch C | s1 | Switch C | s4 | Storage D | d2 | c1 | v2 |
| ServerB | LU1 | b1 | Switch C | s2 | Switch C | s4 | Storage D | d2 | c2 | v2 |

| Error Code | Error Component |
|---|---|
| A1 | Port s1 |
| ..... | ..... |

| Error Code | Error Component | ID |
|---|---|---|
| 1000 | Disk Drive | dd1 |
| ..... | ..... | ..... |
| 2001 | Cache | c2 |
| ..... | ..... | ..... |
| 3000 | Disk Port | p1 |
| ..... | ..... | ..... |

EVENT NOTIFICATION METHOD IN STORAGE NETWORKS

CROSS REFERENCE TO RELATED APPLICATION

The present application is a continuation of U.S. patent application Ser. No. 10/237,402, filed Sep. 6, 2002, the entire disclosure of which is incorporated herein by reference.

BACKGROUND OF THE INVENTION

The present invention relates to storage networks, more particularly to event notification methods and systems in a storage network.

Data is the underlying resources on which all computing processes are based. With the recent explosive growth of the Internet and e-business, the demand on data storage systems has increased tremendously. Generally, storage networking encompasses two applications or configurations: network-attached storage (NAS) or storage area network (SAN). A NAS uses IP over Ethernet to transports data in file formats between storage servers and their clients. In NAS, an integrated storage system, such as a disk array or tape device, connects directly to a messaging network through a local area network (LAN) interface, such as Ethernet, using messaging communications protocols like TCP/IP. The storage system functions as a server in a client-server system.

Generally, a SAN is a dedicated high performance network to move data between heterogeneous servers and storage resources. Unlike NAS, a separate dedicated network is provided to avoid any traffic conflicts between client and servers on the traditional messaging network. A SAN permits establishment of direct connections between storage resources and processors or servers. A SAN can be shared between servers or dedicated to a particular server. It can be concentrated in a single locality or extended over geographical distances. SAN interfaces can be various different protocols, such as Fibre Channel (FC), Enterprise Systems Connection (ESCON), Small Computer Systems Interface (SCSI), Serial Storage Architecture (SSA), High Performance Parallel Interface (HIPPI), or other protocols as they emerge in the future. For example, the Internet Engineering Task Force (IETF) is developing a new protocol or standard iSCSI that would enable block storage over TCP/IP, while some companies are working to offload the iSCSI-TCP/IP protocol stack from the host processor to make iSCSI a dominant standard for SANs.

Currently, Fibre Channel (FC) is the dominant standard or protocol for SANs. FC is the performance leader today at 1 Gbps and 2 Gbps link speeds and offers excellent (very low) latency characteristics due to a fully offloaded protocol stack. Accordingly, Fibre Channel-based SANs are often used in high-performance applications. FC at 2 Gbps is expected to remain unchallenged in the data center for the foreseeable.

In order to properly utilize the high-performance and versatile SANs, they need to be managed efficiently. One important management function in storage networks is the event notification management. Event notification management in a SAN can be challenging since it generally includes different hardware and operating systems from various vendors with different proprietary messaging languages or rules.

BRIEF SUMMARY OF THE INVENTION

Embodiments of the present invention relates to event notification and event management within a storage network such as a storage area network (SAN). In one embodiment, a network manager, e.g., a SAN manager, collects information from devices within the storage network. The network manager includes a Trap dictionary for each device within the network. The dictionary is used to interpret event messages received from the devices experiencing failure or is about to experience failure. The network manager is configured to identify a specific component within a device with the problem and determine an effect of the event. The network manager is configured to display an event notification on a centralized management console providing the cause and effect of the event.

In one embodiment, a heterogeneous network includes network related hardware and software products from a plurality of vendors. The network includes a storage system configured to store data, a server configured to process requests, a switch coupling the storage system and the server for data communication, and a network manager including an event dictionary to interpret an event message received from a device experiencing failure.

In another embodiment, a storage area network (SAN) includes a network manager including an event dictionary to interpret an event message received from a device experiencing failure, the device being provided within the SAN.

In another embodiment, a management server configured to manage a storage area network (SAN) includes a network manager including an event dictionary to interpret an event message received from a device experiencing failure, the device being provided within the SAN.

In another embodiment, a storage area network (SAN) includes a plurality of application servers configured to handle data requests. A management server is configured to handle management functions of the SAN and includes a SAN manager. The SAN manager includes a Trap dictionary to interpret an error code included in a Trap message from a device experiencing failure. The device has a plurality of components, where one of the plurality of components is experiencing problem. A plurality of storage subsystems are configured to store data. A plurality of switches are configured to transfer data between the application servers and the storage subsystems. The SAN is a heterogeneous network including network products from a plurality of vendors with different rules for error codes.

Yet in another embodiment, a method of managing a storage network includes providing a plurality of network products manufactured from a plurality of vendors. An event message is received from a device including a plurality of components, wherein one of the components is experiencing failure. The event message includes an error code identifying the one component experiencing the failure. An event dictionary is accessed to interpret the error code in the event message. The event dictionary includes an error code list and a corresponding error component list. An identity of the component experiencing the failure is determined using the error code list in the event dictionary.

BRIEF DESCRIPTION OF THE DRAWINGS

FIG. 2C illustrates a disk port table provided in a management agent of the storage subsystem of FIG. 2B according to one embodiment of the present invention.

FIG. 2D illustrates a device table provided in a management agent of the storage subsystem of FIG. 2B according to one embodiment of the present invention.

FIG. 2E illustrates a path table provided in a management agent of the storage subsystem of FIG. 2B according to one embodiment of the present invention.

FIG. 3B illustrates a port link table provided in a management agent of a SAN switch of FIG. 3A according to one embodiment of the present invention.

FIG. 4A illustrates a schematic diagram of application servers of a SAN according to one embodiment of the present invention.

FIGS. 4B and 4C illustrate schematic diagrams of host port tables of an application server according to one embodiment of the present invention.

FIGS. 4D and 4E illustrate schematic diagrams of a LUN binding tables of an application server according to one embodiment of the present invention.

FIG. 5D illustrates a discovery list of a SAN manager according to one embodiment of the present invention.

FIGS. 6A and 6B illustrate Trap dictionaries for a storage subsystem and SAN switch of a SAN manager according to one embodiment of the present invention.

DETAILED DESCRIPTION OF THE INVENTION

The present invention relates to event notification management in a storage network, such as a storage area network (SAN), network attached network (NAS), or the like. In particular, the present invention relates to event notification management in a storage network using heterogeneous hardware and/or software systems. Heterogeneous systems have hardware or software products, or both from multiple vendors. Specific embodiments of the present invention are described below using SANs for convenience of explanation and should not be used to narrow the scope of the present invention.

As used herein, the term "SAN" or "sub-network" refers to a centrally managed, high-speed storage network that is coupled to a messaging network and includes multi-vendor storage devices, multi-vendor storage management software, multi-vendor servers, multi-vendor switches, or other multi-vendor network related hardware and software products. The extent of the heterogeneous nature of the SAN or sub-network varies. Some SANs or sub-networks have multi-vendor products for all of the above network devices and components, while others have multi-vendor products for a portion of the above device and components.

As used herein, the term "storage network" refers to a network coupled to one or more storage systems and includes multi-vendor storage devices, multi-vendor storage management software, multi-vendor application servers, multi-vendor switches, or other multi-vendor network related hardware and software products. The "storage network" generally is coupled to another network, e.g., a messaging network, and provides decoupling of the back-end storage functions from the front-end server applications. Accordingly, the storage network includes the SAN, NAS, and the like.

Figure 1:
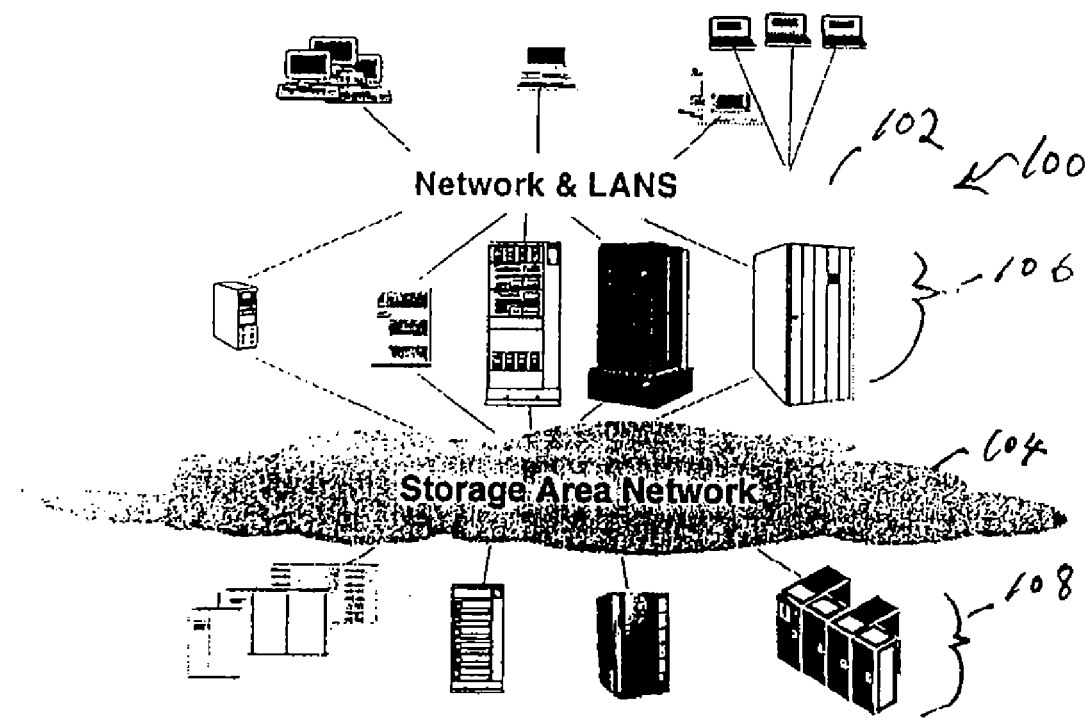
FIG. 1 illustrates a schematic diagram of a network including a storage network coupled to a messaging network according to one embodiment of the present invention.

FIG. 1 schematically illustrates a network system 100 including one or more messaging networks 102 and a SAN 104 connecting a plurality of servers 106 to a plurality of storage systems 108. The network 102 may be a local area network, a wide area network, the Internet, or the like. The network 102 enables, if desired, the storage devices 108 to be centralized and the servers 106 to be clustered for easier and less expensive administration.

The SAN 104 supports direct, high-speed data transfers between servers 106 and storage devices 108 in various ways. Data may be transferred between the servers and storage devices. A particular storage device may be accessed serially or concurrently by a plurality of servers. Data may be transferred between servers. Alternatively, data may be transferred between storage devices, which enables data to be transferred without server intervention, thereby freeing server for other activities. For example, a storage system may back up its data to another storage system at predetermined intervals without server intervention.

Accordingly, the storage devices or subsystems 108 is not dedicated to a particular server bus but is attached directly to the SAN 104. The storage subsystems 108 are externalized and functionally distributed across the entire organization.

In one embodiment, the SAN 104 is constructed from storage interfaces and is coupled to the network 102 via the servers 106. Accordingly, the SAN may be referred to as the network behind the server or sub-network.

In another embodiment, a SAN is defined as including one or more servers, one or more SAN switches or fabrics, and one or more storage systems. In yet another embodiment, a SAN is defined as including one or more servers, one or more SAN switches or fabrics, and ports of one or more storage systems. Accordingly, the term SAN may be used to referred to various different network configurations as long as the definition provide above is satisfied.

Figure 2A:
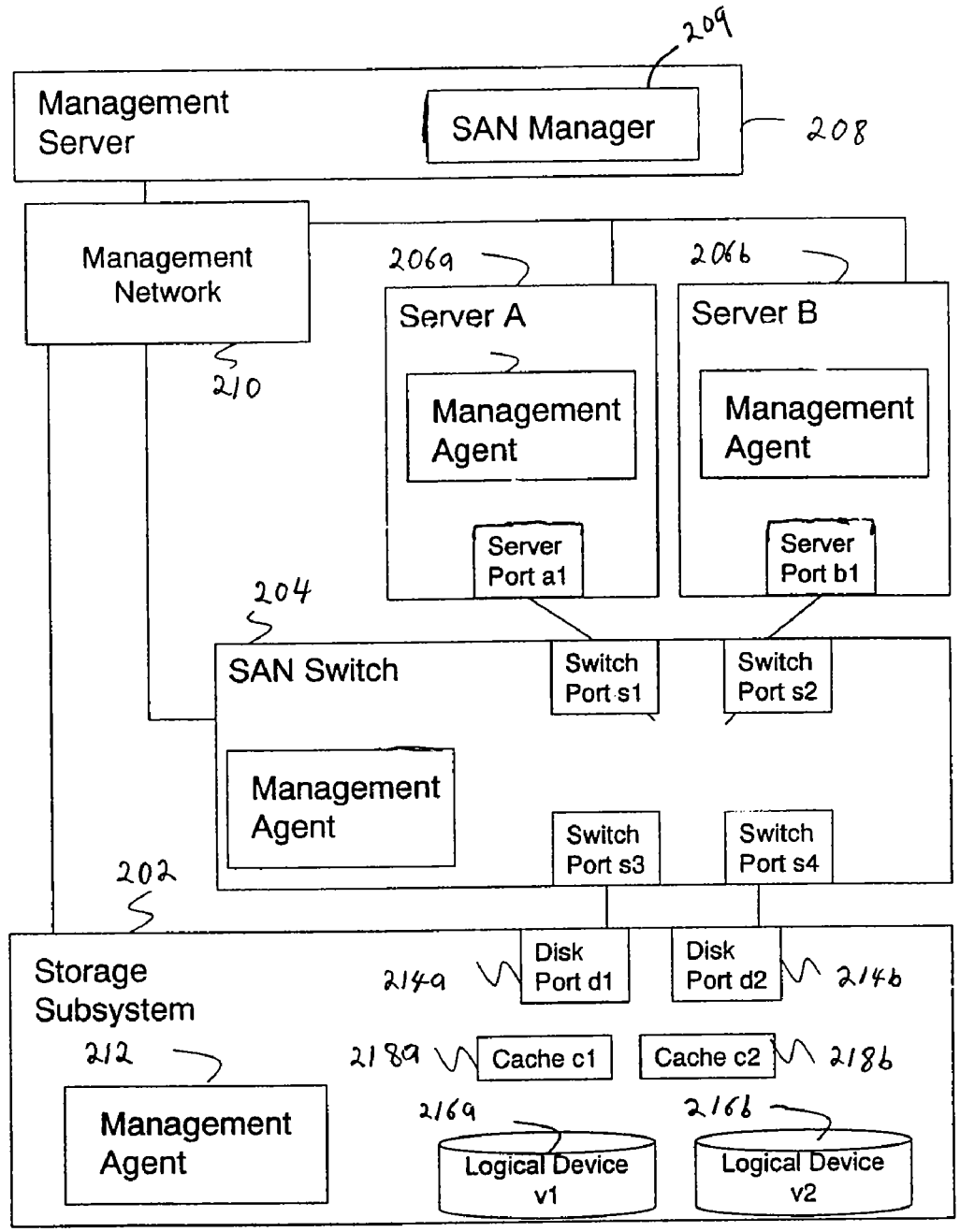
FIG. 2A illustrates a schematic diagram of a storage area network including a management server and a SAN manager according to one embodiment of the present invention.

FIG. 2A illustrates a SAN system 200 including a storage system (or subsystem) 202, a SAN switch or fabric 204, a plurality of servers 206a and 206b, a management server 208, and a management network 210. The management server 208 includes a SAN manger 209 that manages the SAN, as explained in more detail later. Although a single storage subsystem is illustrated in the SAN system 200, a plurality of storage subsystems are provided in other embodiments. Similarly, in other embodiments, the number of other network components may be different from the illustrated example.

The storage subsystem 202 includes a management agent 212, a plurality of disk ports 214a and 214b, a plurality of logical devices 216a and 216b, and a plurality of caches 218a and 218b. The disk ports 214a and 214b are also referred to as the disk ports d1 and d2. The logical devices 216a and 216b are also referred to as the logical devices v1 and v2. The management agent 202 manages the configuration of the storage subsystem and communicates with the management server 208. For example, the agent 212 provides the management server 208 with the data I/O path, the connection information of the disk ports d1 and d2, and any failure experienced by the components in the storage subsystem 202, as described in more detail below. The disk ports 214a and 214b are connection ports to the SAN switch 204 to transfer and receive data to and from the servers 206a and 206b. The connection protocol used for the present embodiment is Fibre Channel but other protocols may be used, e.g., SCSI, FC over IP, or iSCSI.

Figure 2B:
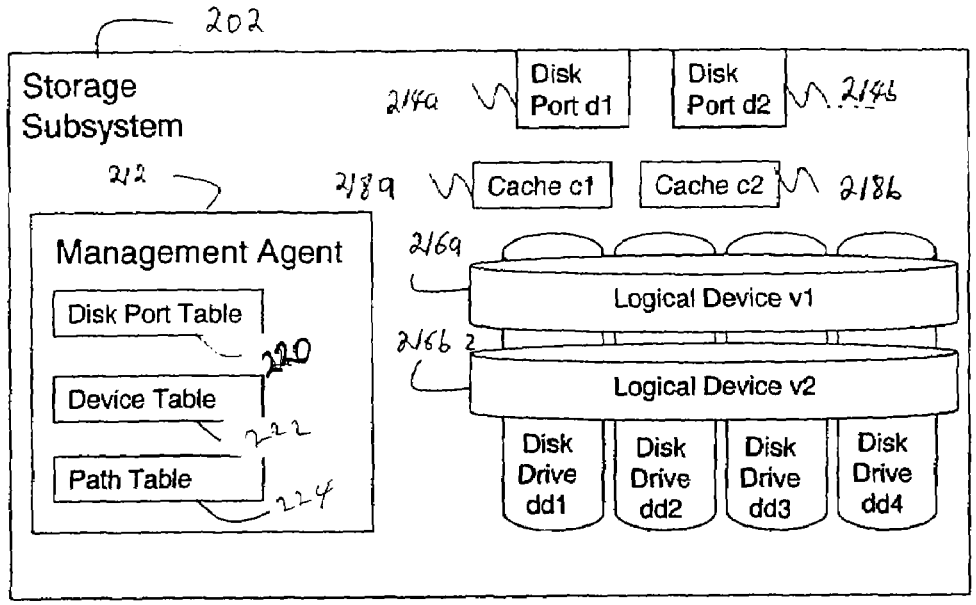
FIG. 2B illustrates a storage subsystem of a SAN according to one embodiment of the present invention.

As well known by a person skilled in the art, the management agent 212 includes a disk port table 220, a device table 222, and a path table 224 (FIG. 2B). These tables are updated periodically as configuration information changes. The disk port table 220 includes a disk port ID 226 that provides information about the disk ports in the storage subsystems, such as a "nickname," and a world wide name (WWN) 228 that provides unique identifier for each disk port (FIG. 2C). The nickname refers to a storage subsystem specific identification name, for example, "d1" that refers to the disk port 214a. The name "d1" is sufficient to identify the disk port within the storage subsystem in question but is insufficient when there is a plurality of storage subsystems since disk ports in other storage subsystems may have been assigned that same name. On the other hand, the unique identifier (referred to as the world wide name in Fibre Channel) is unique identification information assigned to a particular component.

The device table 222 includes a logical device ID 230 that provides information on the relationship between logical devices and disk drives within the storage subsystems and a disk drive list 232 (FIG. 2D). The path table 224 includes a path ID 234 that provides the nickname for the path, a disk port ID 236 that identifies the disk port attached to the path, a cache ID 238 that identifies the cache attached to the path, a logical device ID 240 that provides the nickname of the logical device attached to the path, a SCSI ID 242 that identifies the SCSI attached to the path, and a SCSI LUN 244 that provides information about the SCSI LUN attached to the path (FIG. 2E).

The logical devices 216a and 216b are volumes that are exported to the servers. The logical device may consist of a single physical disk drive or a plurality of physical disk drives in a redundant array of independent disks (RAID). A RAID storage system permits increased availability of data and also increase input/output (I/O) performance. In a RAID system, a plurality of physical disk drives are configured as one logical disk drive, and the I/O requests to the logical disk drive are distributed within the storage system to the physical disk drives and processed in parallel. RAID technology provides many benefits. For example, a RAID storage system can accommodate a very large file system, so that a large file can be stored in a single file system, rather than dividing it into several smaller file systems. Additionally, RAID technology can provide increased I/O performance because data on different physical disk can be accessed in parallel. In one embodiment, each logical device includes four physical disk drives dd1, dd2, dd3, and dd4, as illustrated in FIG. 2B.

The caches 218a and 218b are data caches associated with the logical devices 216a and 216b. They are provided to expedite data processing speed. In other embodiments, the storage subsystem does not include any cache.

Figure 3A:
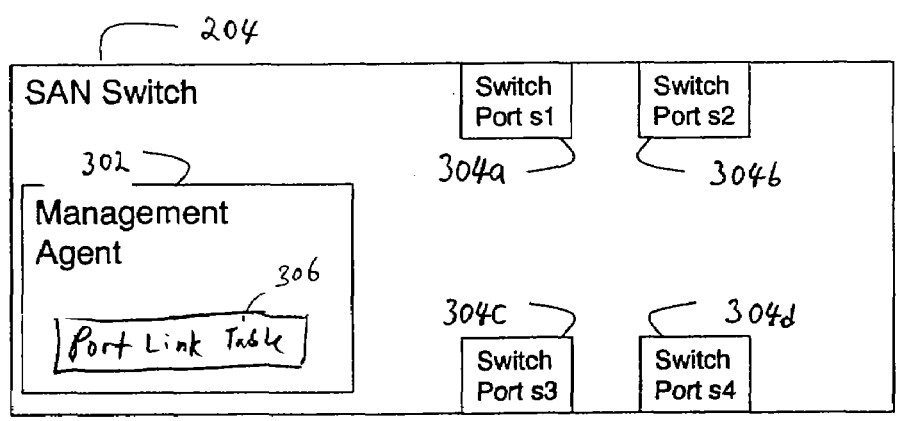
FIG. 3A illustrates a schematic diagram of a SAN switch of a SAN according to one embodiment of the present invention.

Referring to FIG. 3A, the SAN switch 204 connects the servers and storage subsystems. The switch 204 provides data connection between the servers and storage subsystems. In one embodiment, the switch may be coupled to a bridge, router, or other network hardware to enlarge the network coverage. The switch 204 includes a switch management agent 302 that manages the configuration of the switch and a plurality of switch ports 304a, 304b, 304c, and 304d. These switch ports also are referred to as s1, s2, s3, and s4, respectively, as indicated by FIG. 3A. The switch management agent 302 assists the management server 208 in managing the SAN by providing the server 208 with the connection information of the switch ports and notifying the server 208 if failure occurs in any component within the switch 204. The management agent 302 includes a port link table 306 that provides information on the interconnect relationship between servers and storage subsystems via switches (also referred to as "link"). The port link table 306 includes a switch port ID 308 that provides identification information or nickname for each switch port, a switch port world wide name (WWN) 310 that provides a unique identifier of each switch port, and a link WWN 312 that provides a unique identifier of the target device that is connected to each switch port (FIG. 3B).

Figures 4A, 4B, 4D:
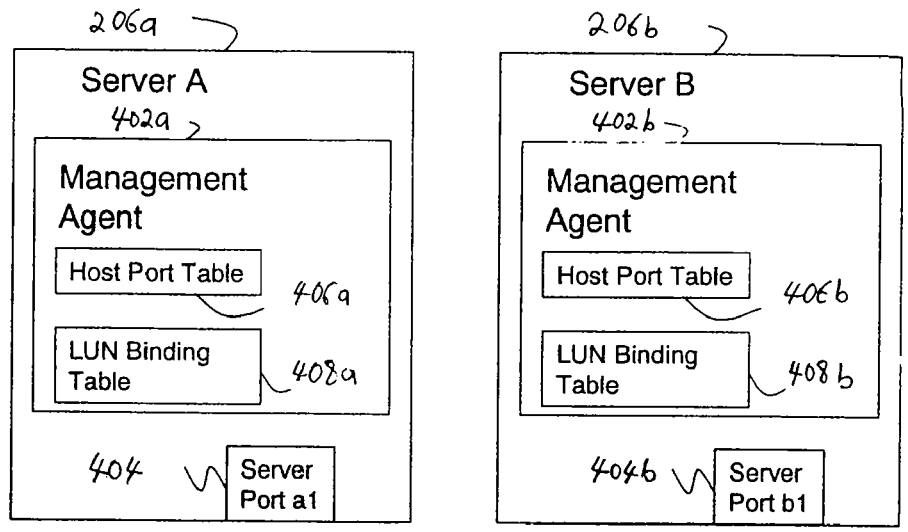

FIG. 4A illustrates the servers 206a and 206b for application use in more detail. In the present embodiment, separate servers are used to perform the application and management functions. Each server 206 includes a server management agent 402 that manages the configuration of the server and a server port 404 for data connection. The server management agent 402 assists the management server 208 in managing the SAN by providing the server 208 with the connection information of the server ports and notifying the server 208 if failure occurs in any component within the server 206. The agent 402 is generally provided within the server for convenience. Also the agent 402 includes a host port table 406 and a LUN binding table 408. The host port table provides the information on the host or server ports in a server.

Referring to FIG. 4B, the host port table 406a, provided in the agent 402a, includes a plurality of columns for storing information on the ports in the server. The table 406a includes a host port ID 410a that provides a device specific identification information or nickname for a particular port within the server, a world wide name 412a that provides a unique port identification information, and a SCSI ID 414a that provides a SCSI identification information assigned to a particular port by an network administrator. Generally, a single SCSI ID is assigned for a server port in the SAN. The worldwide name 412a is a term used in connection with Fibre Channel, so other comparable terms may be used if a different connection protocol is used. FIG. 4C shows the host port table 406b provided in the agent 402b. The host port table 406b includes a host port ID 410b, a world wide name 412b, and a SCSI ID 414b.

Referring to FIG. 4D, the LUN binding table 408a, provided in the agent 402a, provides the information on the data I/O path from the host port to the SCSI Logical Unit, also referred to as "LUN binding" or "binding." The table 408a includes a binding ID 416a that provides a device specific identification information or nickname for the binding, a host port ID 418a, corresponding to the host port ID 410a of the table 406a, that provides a nickname for a particular port, a SCSI ID 420a, corresponding to the SCSI ID 414a of the table 406a, that is attached to the binding, a LUN 422a that provides a SCSI LUN attached to the binding, and an inquiry information 424a that provides the information given by the LUN when servers issue SCSI INQUIRY commands to the LUN. The inquiry information generally includes information such as vendor name, product name, and logical device ID of the LUN. FIG. 4E shows the LUN binding table 408b provided in the agent 402b. The LUN binding table 408b includes a binding ID 416b, a host port ID 418b, a SCSI ID 420b, a LUN 422b, and an inquiry information 424b.

Figures 5A, 5B:
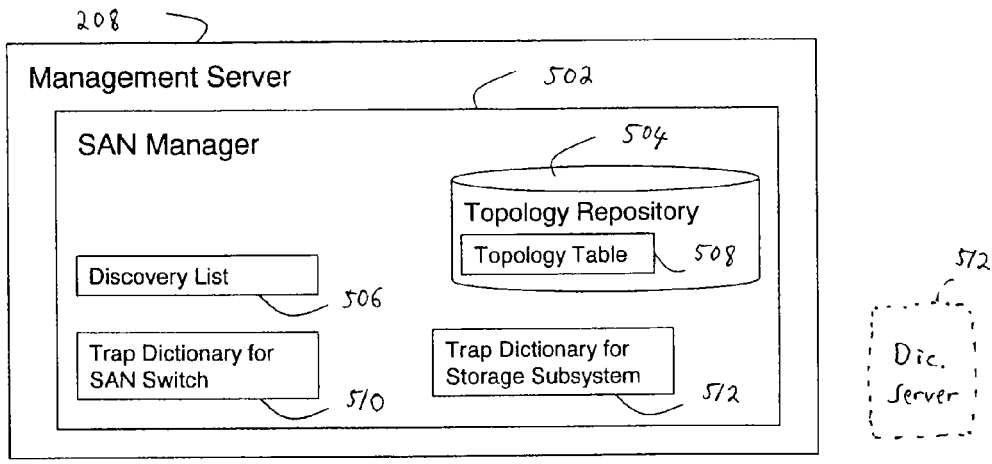
FIG. 5A illustrates a schematic diagram of a management server of a SAN according to one embodiment of the present invention.
FIG. 5B illustrates a topology table of a SAN manager according to one embodiment of the present invention.
Figure 5B:
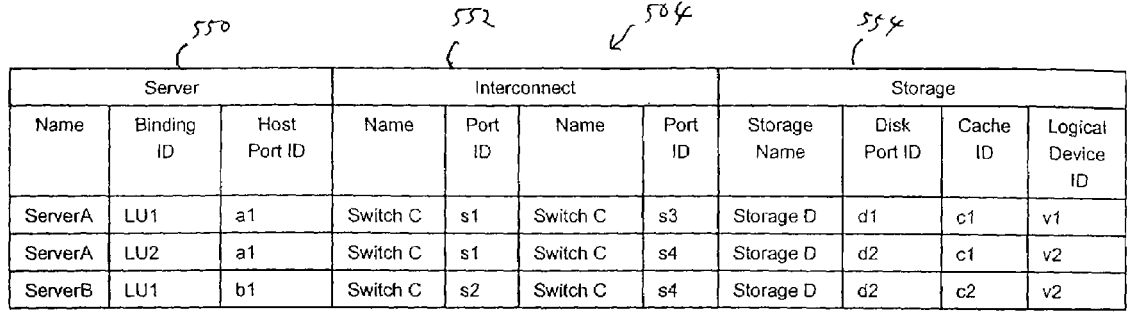

FIG. 5A illustrates the management server 208 that is dedicated to the management related functions of the SAN according to one embodiment of the present invention. In another embodiment, a single server may perform the dual functions of the application servers and management servers.

The management server 208 includes a SAN manager or network manager 502 that is used to manage the SAN to ensure efficient usage of the network. The manger 502 includes all physical and logical connection information obtained from various components within the SAN. Accordingly, the manager 502 communicates with the management agents, e.g., the switch management agent 302, server management agent 402, and storage system management agent 212, within the SAN to obtain the respective configuration tables via the management network 210. Accordingly, the SAN manager or network manager 502 includes a topology repository 504 and a discovery list 506.

The topology repository 504 includes a topology table 508 that provides the topology of the I/O communication in a SAN. The topology table 508 is made by merging the tables, e.g., the host port table, LUN binding table, and the like, obtained from the devices within the SAN. Referring to FIG. 5B, the topology table includes a server section 550 that provides binding ID and host port ID information on the servers in the SAN, an interconnect section 552 that provides information on the switches in the SAN, and an storage section 554 that provides information on the storage subsystems including the disk port ID, cache ID, and logical device ID.

Figure 5C:
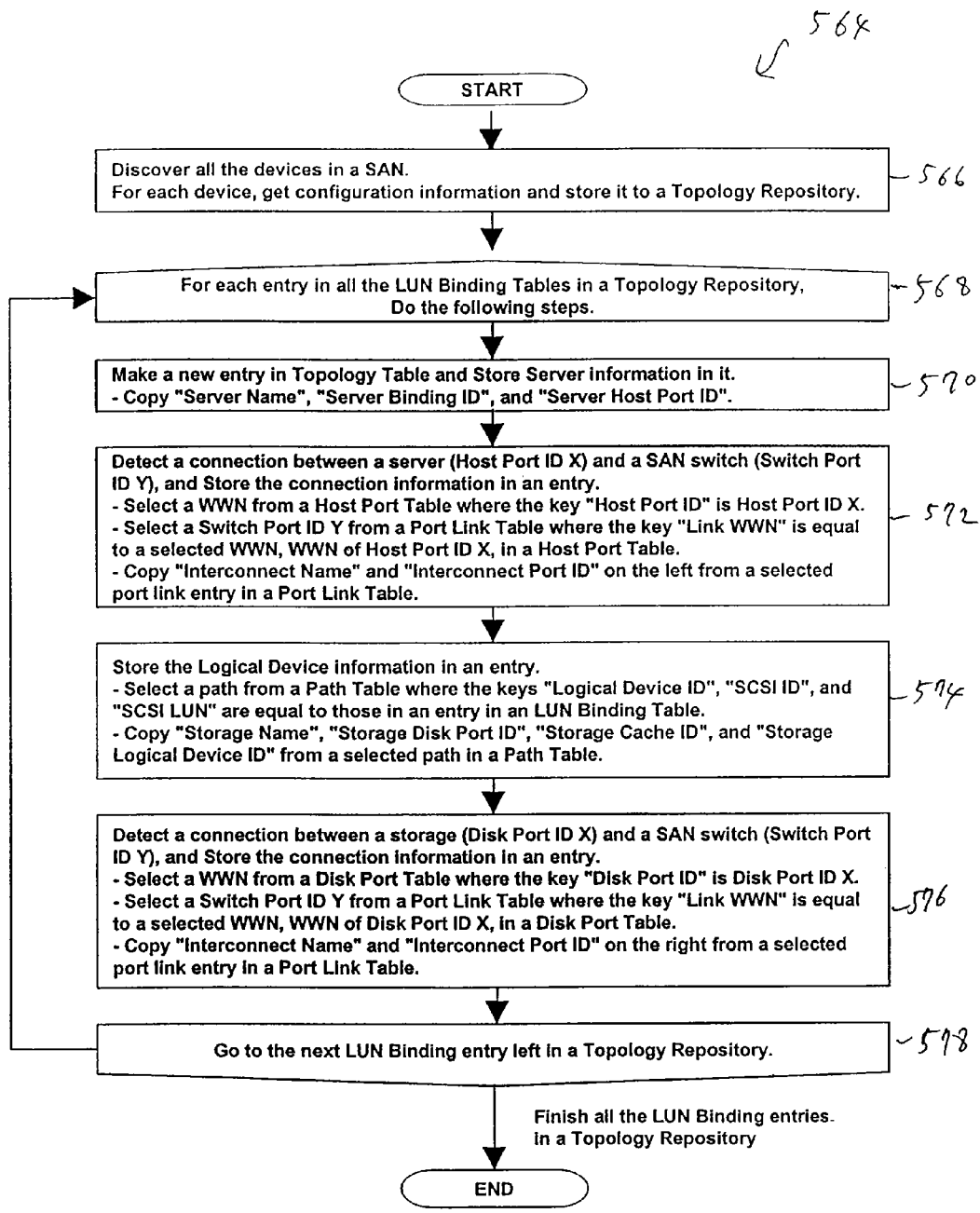
FIG. 5C illustrates a process of generating the topology table of FIG. 5B according to one embodiment of the present invention.

FIG. 5C shows a process 564 performed by the SAN manager 502 to generate the topology table 504 according to one embodiment of the present invention. All the devices provided in the SAN are detected (step 566). Configuration information of each detected device is retrieved and stored in the topology repository. Each LUN binding entry is retrieved until all entries are retrieved (step 568). For each entry, a new entry in the topology table is made and server information is stored therein, e.g., server name, server binding ID, and server host port ID (step 570). A connection between a server (host port ID X) and a SAN switch (switch port ID Y) is detected, and the connection information is stored in the entry (step 572). This step involves selecting a WWN from a host port table where the key "host port ID" is host port ID X, selecting a switch port ID Y from a port link table where the key "link WWN" is equal to a selected WWN, i.e., WWN of host port ID X, in a host port table, and copying "interconnect name" and "interconnect port ID" from a selected port link entry in a port link table.

Thereafter, the logical device information is stored in the entry (step 574). This step involves selecting a path from a path table where the keys "logical device ID," "SCSI ID," and "SCSI LUN" are equal to those in an entry in an LUN binding table, and copying "storage name," "storage disk port ID," "storage cache ID," and "storage logical device ID" from a selected path in a path table.

Next, a connection between a storage (disk port ID X) and a SAN switch (switch port ID Y) is detected and the connection information is stored in the entry (step 576). This step involves selecting a WWN from a disk port table where the key "disk port ID" is disk port ID X, selecting a switch port ID Y from a port link table where the key "link WWN" is equal to a selected WWN, i.e., WWN of disk port ID X, in a disk port table, and copying "interconnect name" and "interconnect port ID" on the right from a selected port link entry in a port link table. After the step 576, the next LUN binding entry is retrieved (step 578), and the above steps are repeated until all entries have been processed.

The discovery list 506 includes the information on all the devices in a SAN. The SAN manager 502 uses information from this list to retrieve the configuration information from the management agents in the SAN devices. Referring to FIG. 5D, the discovery list includes a discovery ID section 556 that provides a nickname of the target SAN device to be discovered, a device type section 558 that identifies the device type of the target SAN device, a device information section 560 that provides vendor information or other detailed information about the target SAN device, an IP address section 562 that provides the IP address of the target SAN device to facilitate communication between the SAN manager and the target SAN device. In the present embodiment, the communication protocol used is TCP/IP.

The SAN manager 502 is configured to perform the event management using one or more Trap dictionaries (to be described below) as well the topology table and the discovery list described above. The manager 502 receives an event message from a component in the SAN that is experiencing problem. The event is then notified to a network administrator, so that an appropriate action may be taken. One common protocol used for event notification is Simple Network Management Protocol (SNMP), an IP-based protocol. In the present embodiment, the manager 502 is configured to handle the SNMP messages.

In operation, a device that is experiencing problem issues an SNMP Trap message to the manger 502. The manager 502, upon receipt of the message, can determine the cause of the problem and also the consequent effects of the event or problem in the SAN. For example, if failure occurs at the switch port 304a of the SAN switch 204, the manager 502 can determine that an event message has been received because of the switch port 304a's failure and that this failure affects the server 206a from accessing the logical device v1. Such a precise diagnosis of the cause and effect of an event has not been possible in the conventional SAN managers because a SAN includes hardware and software from many different vendors with different messaging rules. Accordingly, the conventional SAN managers, in a similar situation, can merely inform the network administrators that the SAN switch 204 is experiencing problem and little else.

In order to provide such a precise diagnosis of cause and effect of the event, the manager 502 includes one or more Trap dictionaries (also referred to as "event dictionaries" or "look-up tables") to decipher or interpret the Trap messages received by the manager 502. In one embodiment, the manager 502 includes a plurality of Trap dictionaries for various hardware and software vendors. The Trap dictionaries may be stored in a number of different ways. The Trap dictionaries may be stored according to the device type, so that all the Trap dictionaries relating to SAN switches are stored under a single location. Alternatively, the Trap dictionaries may be stored according to a vendor specific file.

In the present embodiment, the Trap dictionaries are stored according to the device type. Accordingly, the manager 502 includes a Trap dictionary 510 for SAN switches and a Trap dictionary 512 for storage subsystems. The switch Trap dictionary 510 includes an error code 602 that may be attached to a Trap message to notify occurrence of a particular event and an error component 604 that identifies a component that is experiencing problem (FIG. 6A). For example, if problem occurs with a port s1 in the SAN switch 204, a Trap message including an error code "A1" is sent to the manager 502. The manager 502 can determine the meaning of the error code by looking up the switch Trap dictionary 510.

Similarly, the storage Trap dictionary 512 includes an error code 606 that may be attached to a Trap message to notify occurrence of a particular event, an error component 608 that identifies a component that is experiencing problem, and an ID 610 that provides the component ID information. In one embodiment, the management server includes a dictionary server 512 that is used to look-up the appropriate Trap dictionaries upon receipt of a Trap message.

Figure 7:
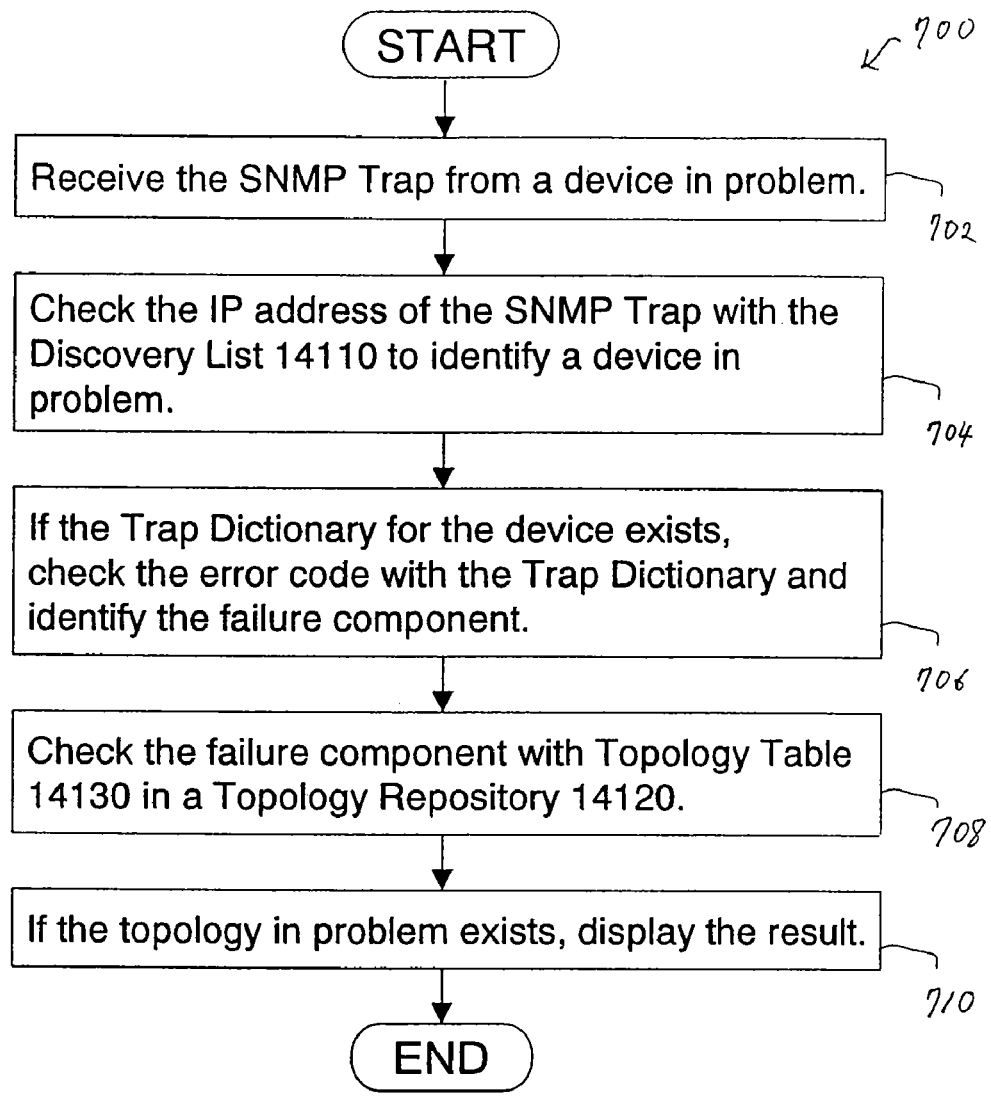
FIG. 7 is a flow diagram illustrating an event notification method according to one embodiment of the present invention.
Figure 8A:
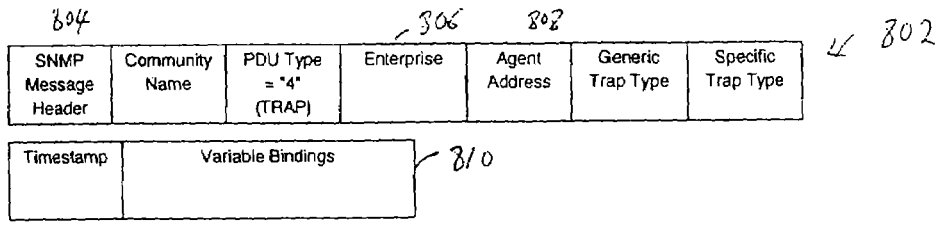
FIGS. 8A-8C illustrate Trap messages including error codes according to one embodiment of the present invention.
Figure 8B:
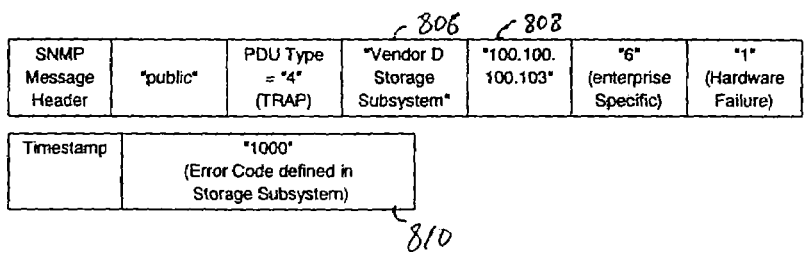

FIG. 7 is a flow chart 700 illustrating handling of an event notification in the SAN using the SAN manager 502 according to one embodiment of the present invention. The manager 502 receives a SNMP Trap message from a device experiencing failure (step 702). The device includes a plurality of components, of which one of them is experiencing failure. The Trap message includes an appropriate error code to identify the exact component with the problem. The manager 502 checks the IP address of the SNMP Trap using the discovery list to identify the device in question (step 704). If the Trap dictionary for the device exists, the error code in the message is looked up and the specific component within the device that is having problem is identified (step 706). The component experiencing failure is looked up using the topology table in the topology repository (step 708). If the topology problem exists, the problem is identified to the user (step 710). FIG. 8A illustrates an exemplary SNMP Trap message 802 according to one embodiment of the present invention. The Trap message includes a header 804, an enterprise section 806 to identify a vendor of the device in question, an agent section 808 to provide an IP address of the device in question, and a variable binding 810 for an error code associated with a particular event. FIG. 8B illustrates a Trap message 812 transmitted to the manager 502 in response to failure of a disk drive in the storage subsystem 202. The message 812 indicates in the enterprise 806 that the device experiencing failure is a storage subsystem manufactured by vendor D, the agent address 808 indicates that the IP address of the device is 100.100.100.103, and the variable binding section 810 indicates the component experiencing the problem in the device is the disk drive dd1. The manager 502 examines the topology table and determines that the failure in the disk drive dd1 has caused the failure of the logical device v1. The manager 502 also determines that the server 206a cannot access the logical device v1 as a result of this failure. The manager 502 sends an event notification to the network administrator providing information about the failure of disk drive dd1 and the server 206a's inability to access the logical device v1. This event notification may be in the form of text or graphic illustration, or a combination thereof.

Figure 9A:
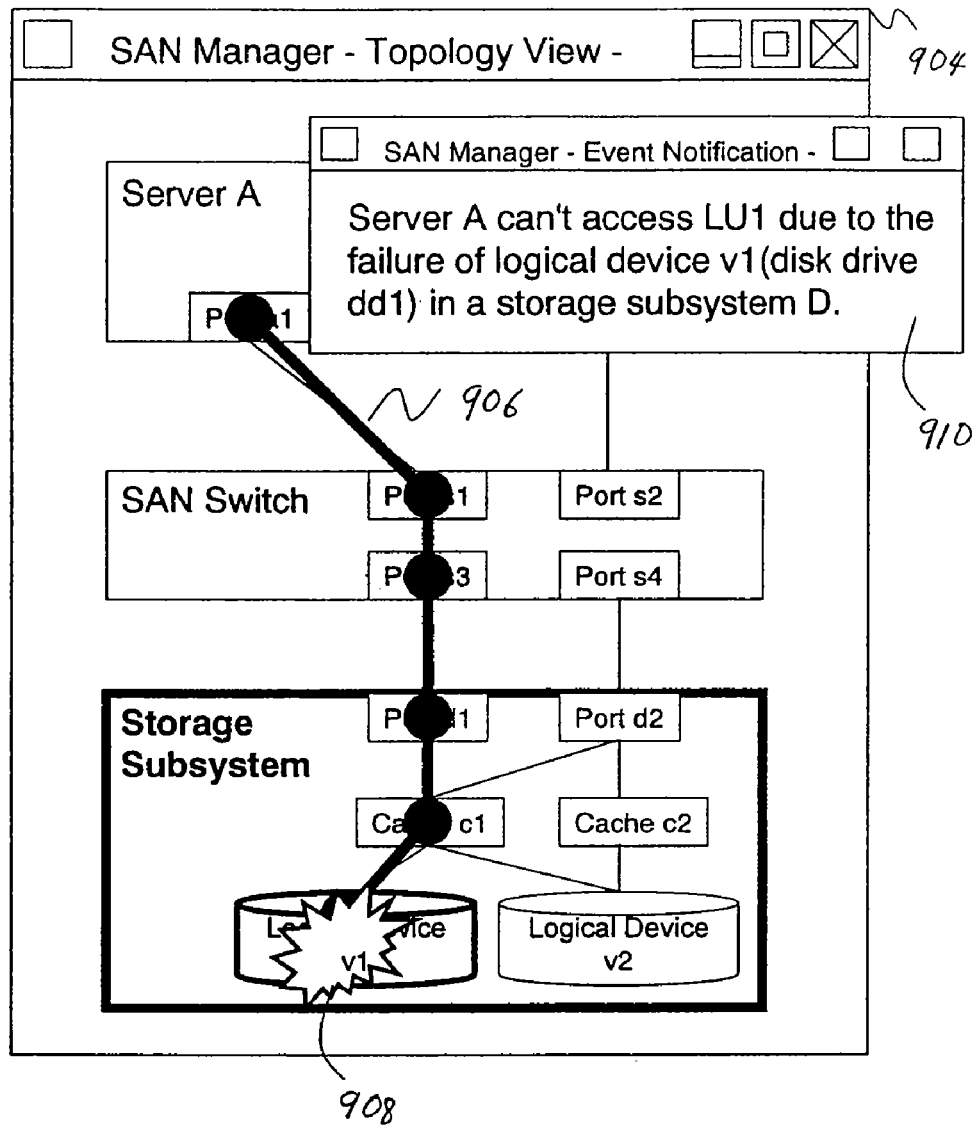
FIGS. 9A and 9B illustrate schematic event notifications provided to a network administrator by a SAN manager according to one embodiment of the present invention.

FIG. 9A illustrates an event notification 902 provided to a network administrator to inform him or her of the occurrence of the event described above according to one embodiment of the present invention. The event notification includes a topology view 904 providing a graphic illustration of the SAN topology, a data path 906 affected by the event, a component 908 experiencing the failure, and an event summary 910 detailing the component that has failed and the effects of that failure.

Figure 8C:
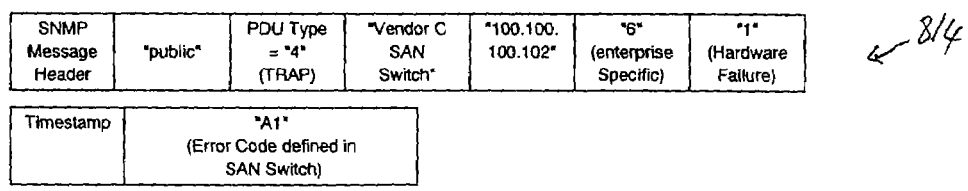

FIG. 8C illustrates a Trap message 814 transmitted to the manager 502 in response to the failure of a port in the SAN Switch. The message 814 indicates in the enterprise 806 that the device experiencing failure is a SAN switch manufactured by vendor C, the agent address 808 indicates that the IP address of the device is 100.100.100.102, and the variable binding section 810 indicates the component experiencing the problem in the device is a switch port s1. The manager 502 uses the topology table to determine that the failure in the switch port s1 is preventing the server 206a from accessing the logical device v1. The manager 502 sends an event notification to the network administrator providing information about the failure of the switch port s1 and the resulting effect of the server 206a's failure to access the logical device v1.

Figure 9B:
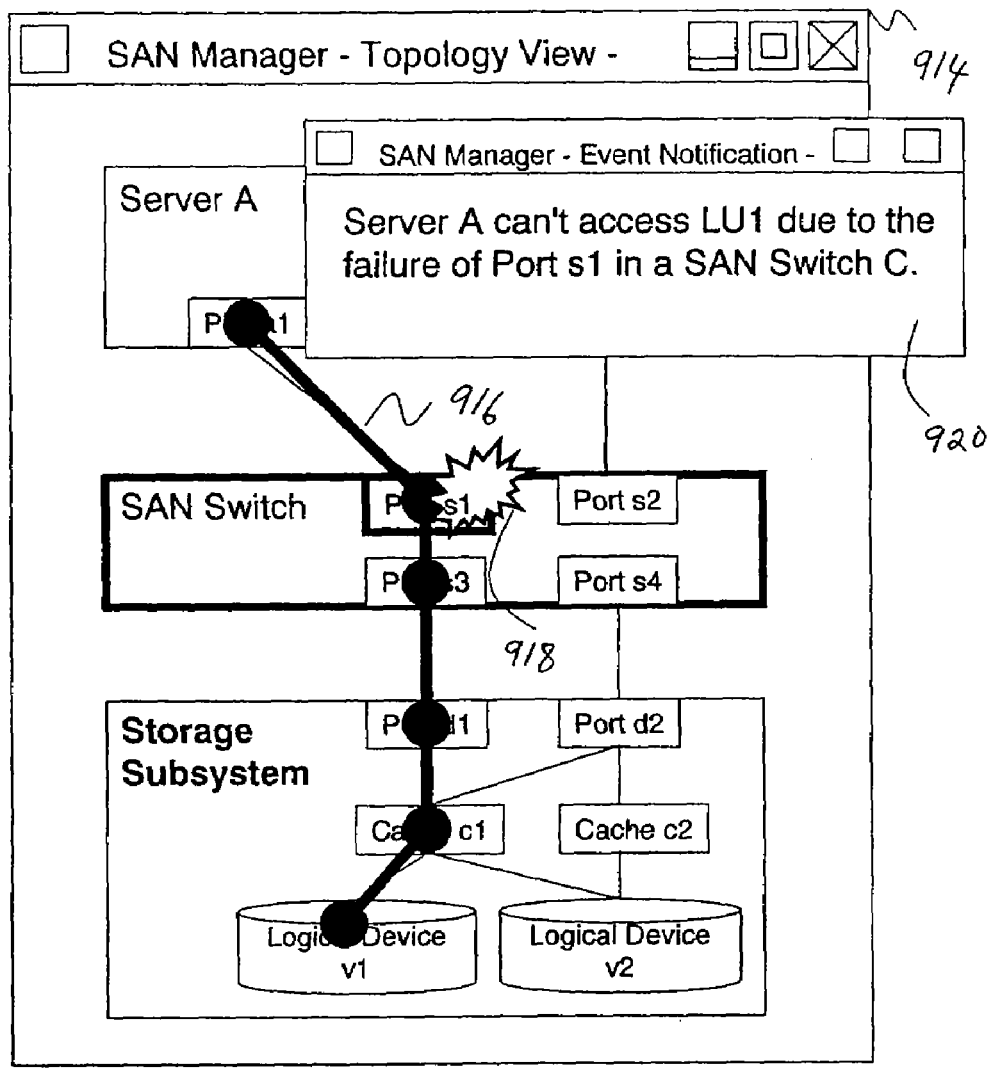

FIG. 9B illustrates an event notification 912 displayed to the network administrator to notify the event described above according to one embodiment of the present invention. The event notification includes a topology view 914 providing a graphic illustration of the SAN topology, a data path 916 affected by the event, a component 918 experiencing the failure, and an event summary 920 detailing the component that has failed and the effects of that failure.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. An event notification method performed by a storage area network (SAN) manager running on the first server, wherein the first server is coupled to at least one second server, a plurality of switches, and a plurality of storage subsystems via a network, the method comprising:
   receiving from the second server information on an I/O path between the second server and logical volumes that the second server accesses;
   receiving configuration information from the switches and the storage subsystems of different vendors;
   generating topology information on the SAN by using the information from the second server and the configuration information;
   if a fail occurs at a switch in the plurality of switches or a storage subsystem in the plurality of storage subsystems, receiving an event message directly and exclusively from the failed switch or the failed storage subsystem, wherein the event message is generated in response to a failure of one of plural ports within the switch, and wherein the event message includes an error code corresponding to the failure;
   determining a failed port within the switch that is experiencing the failure by interpreting the error code;
   determining which one or more logical volumes the second server cannot access due to the failed port using the topology information and the event message; and
   providing a topology map of components that are affected by the failure wherein the topology map includes the failed port within the switch, the one or more logical volumes which the second server cannot access due to the failed port within the switch, and the second server which cannot access the one or more logical volumes due to the failed port within the switch;
   wherein interpreting the error code comprises using an event dictionary including error codes of various vendors to identify the failed port that is causing the failure.

2. The method of claim 1 wherein the event message is a Simple Network Management Protocol (SNMP) Trap message including the error code corresponding to the failure.

3. The method of claim 1 wherein the event message is a protocol-based message.

4. The event notification method of claim 1, wherein the topology map of components that are affected by the failure includes a graphic illustration of a topology of the SAN, and a data path linking the components that are affected by the failure, and identifies the failed switch in the graphic illustration.

5. The event notification method of claim 4, wherein the topology map of components that are affected by the failure includes an event summary detailing the failed switch and effects of the failure.

6. The event notification method of claim 1, wherein the topology map of components that are affected by the failure includes a graphic illustration of a topology of the SAN, and a data path linking the components that are affected by the failure, and identifies the failed switch in the graphic illustration.

7. The event notification method of claim 1, wherein the topology map of components that are affected by the failure includes an event summary detailing the failed switch and effects of the failure.

8. A management server configured to manage a storage area network (SAN) comprising:
   a connection to a server;
   a connection to a switch;
   a connection to a storage subsystem via a network; and
   a network manager configured to:
   receive from the server information on an I/O path between the server and logical volumes that the second server accesses;
      receive configuration information from the switches and the storage subsystems;
      generate topology information on the SAN by using the information from the server and the configuration information;
      if a fail occurs at a switch or a storage subsystem in the plurality of storage subsystems, receive an event message directly and exclusively from the failed switch or the failed storage subsystem, wherein the event message is generated in response to a failure of one of plural ports within the switch, and wherein the event message includes an error code corresponding to the failure;
      determine a failed port within the switch that is experiencing the failure by interpreting the error code, the interpreting comprising using an event dictionary including error codes of various vendors to identify the failed port that is causing the failure;
      determine which one or more logical volumes the server cannot access due to the failed port using the topology information and the event message; and
      provide a topology map of components that are affected by the failure wherein the topology map includes the failed port within the switch, the one or more logical volumes which the server cannot access due to the failed port within the switch, and the server which cannot access the one or more logical volumes due to the failed port within the switch.

9. The management server of claim 8 wherein the event message is a Simple Network Management Protocol (SNMP) Trap message including the error code corresponding to the failure.

10. The management server of claim 8 wherein the event message is a protocol-based message.

11. The management server of claim 8, wherein the topology map of components that are affected by the failure includes a graphic illustration of a topology of the SAN, and a data path linking the components that are affected by the failure, and identifies the failed switch in the graphic illustration.

12. The management server of claim 11, wherein the topology map of components that are affected by the failure includes an event summary detailing the failed switch and effects of the failure.

13. The management server of claim 8, wherein the topology map of components that are affected by the failure includes a graphic illustration of a topology of the SAN, and a data path linking the components that are affected by the failure, and identifies the failed switch in the graphic illustration.

14. The management server of claim 8, wherein the topology map of components that are affected by the failure includes an event summary detailing the failed switch and effects of the failure.

* * * * *